Aug. 7, 1928.
A. J. NEWTON
1,679,942
METHOD OF PREPARING LARGE ASSEMBLED NEGATIVES FOR PHOTO REPRODUCTION WORK
Filed June 28, 1927
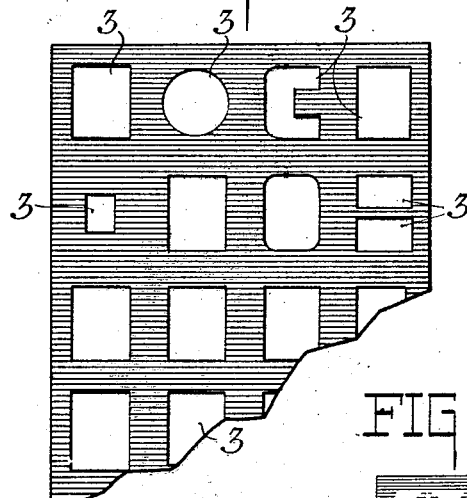
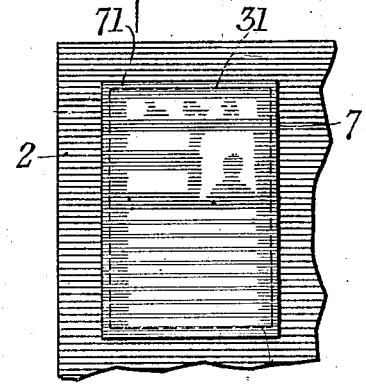
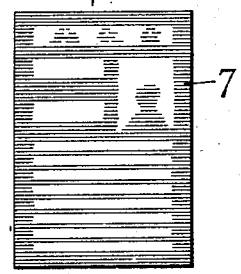
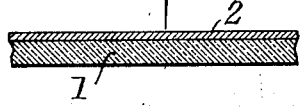
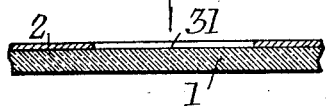
INVENTOR,
Alfred J. Newton,
BY *R. L. Stinchfield*
ATTORNEY Patented Aug. 7, 1928.

1,679,942

UNITED STATES PATENT OFFICE.

ALFRED J. NEWTON, OF ROCHESTER, NEW YORK, ASSIGNOR TO EASTMAN KODAK COMPANY, OF ROCHESTER, NEW YORK, A CORPORATION OF NEW YORK.

METHOD OF PREPARING LARGE ASSEMBLED NEGATIVES FOR PHOTOREPRODUCTION WORK.

Application filed June 28, 1927. Serial No. 202,141.

This invention relates to methods of preparing large assembled negatives for photoreproduction work. One object of the invention is to provide an effective yet extremely simple method for preparing the mask or opaque background into which the elements of the negative are assembled. Other objects will hereinafter appear.

In the accompanying drawing,—

Fig. 1 is a fragmentary diagrammatic plan view of an assembled negative;

Fig. 2 is a diagrammatic fragmentary plan view on a scale which is enlarged relative to that of Fig. 1, so as to show one of the single elements of the negative and the portion of its surrounding mask;

Fig. 3 is a diagrammatic plan view on the same scale as Fig. 2, showing a negative element;

Figs. 4, 5, 6 and 7 are diagrammatic sectional views, upon an exaggerated scale, illustrating successive steps in my process.

In certain branches of photo-reproduction work, such as photo-lithography for book printing, there are prepared very large negatives which are made up from assembled smaller negatives or elements (say one element representing each page of a book, for instance) and a mask or background which surrounds these elements and is opaque to photographic printing light. Both the negative elements and the mask or opaque background are carried by large glass plates. The mask is first prepared on this glass plate and then the negative elements are fastened in proper location over openings prepared in the mask.

Because of the size of these glass plates manipulation of them is difficult. The mask or opaque background has sometimes been prepared photographically. This means that photographic operations have to be carried out by manipulating a heavy and large glass plate of a size corresponding to the large assembled negative. For example, glass plates, of at least the size of the assembled negatives, have been coated with sensitized wet collodion, given a uniform exposure to light, developed, intensified, then dried and coated with rubber and collodion, and the film stripped from the original plate onto the glass plate on which the large negative is to be assembled. Then parts of the opaque mask or background, thus produced, are cut away, and the negative elements are cemented into these openings. It will be seen that the repeated photographic fluid treatments in the preparation of the mask involve the difficult and repeated manipulation of a large-sized plate and the consequent loss of time and an increased labor charge.

I have found that the mask or opaque background of the large assembled negative can be prepared without the trouble and expense of photographic manipulation. In my method the glass plate, on which the assembled negative is to be prepared, is coated with a waterproof lacquer which is opaque to actinic light, can be cut without chipping and can be stripped from the glass at the spots where the negative elements are to be fastened. After the coating is set, the parts which are to be removed are cut around their borders through the coating to the glass and the portions thus isolated are stripped off from the glass, leaving transparent areas bordered by black or opaque mask portions. These openings correspond to the negative elements which are to be assembled and it is only necessary to attach the proper elements over the respective openings to obtain the completed assembled negative.

I shall now refer to the accompanying drawing for one example of my invention. On the large glass plate 1 (Fig. 4) an opaque coating 2 is prepared by brushing or flowing over the plate a suitable lacquer solution.

One illustration of such a solution is as follows: Low viscosity nitrocellulose of the type used in spray lacquers is dissolved in ethyl acetate in the proportion of 32 ounces of the nitrocellulose to each gallon of ethyl acetate. 100 parts by weight of this initial solution are then mixed with 300 additional parts by weight of ethyl acetate, 75 parts of blown castor oil, 450 parts of amyl or butyl acetate and 75 parts of a suitable black pigment, such as ivory black. The pigment, castor oil and sufficient ethyl acetate and amyl acetate to make a paste with them are first mixed in a paint mill until a homogeneous pasty mass results. This is then combined with the solution of the nitrocellulose in ethyl acetate. The final composition is rendered uniform by treatment in a ball mill, say for about twenty-four hours.

Such a lacquer can be conveniently spread over the large glass plate with a brush, the volatile ingredients passing away with sufficient rapidity to quickly leave the coating in a set firm condition. The plate is thus opaque throughout its entire area to actinic light.

The next step is to cut out a series of openings from the opaque face thus produced. Each opening will be of a shape corresponding to the negative element which is to be inserted over it. Thus in Fig. 1 I have illustrated openings 3 of various shapes and sizes, yet so located relative to each other as to be coordinated for book printing. In making these openings a sharp knife is drawn around the border of the desired area, penetrating through the coating 2 to the upper surface of the glass 1. It is of importance that the coating be susceptible to cutting without chipping away and thus leaving irregular borders. Referring to Fig. 5, it will be seen that cuts have been made at 4, for example, and the intermediate portion 5 of the coating is being stripped off. This leaves an opening 31, as indicated in Fig. 6. It is of importance that my lacquer adheres well to the glass, and yet can be readily stripped from it to leave the openings.

The final operation is to bring the negative elements into registry with their respective openings and fasten them over these openings. Thus in Fig. 2 the negative element 7 is brought in registry over the opening 31 and attached in that position. Each negative element may conveniently be a stripped collodion negative of subject matter which is to constitute a page of the book. Such negative elements may be prepared by any well known method,—say by making a wet plate negative, coating it with rubber and then collodion and finally stripping it from its glass support. These thin films may be cut to exactly the size of the openings 3 and 31, but in order to avoid any transparent lines around the margins, it is convenient to have the negative elements, such as 7, trimmed slightly larger than the corresponding openings, such as 31, thus leaving an overlap 71. The negative elements will adhere without fastening or may be fastened with any suitable adhesive, such as glue or other common liquid for attaching collodion strip negatives to glass. In place of these stripped collodion negatives, any other sufficiently thin and flexible negative elements may be substituted.

Having thus described my invention, what I claim as new and desire to secure by Letters Patent is:

In the method of preparing large assembled negatives for photo-reproduction work, the steps of coating a glass plate with a waterproof lacquer which is opaque to actinic light, can be cut without chipping, and can be stripped from the glass, cutting and stripping said coating from separate areas to leave the latter transparent but surrounded by a mask of said coating, and attaching film negatives over said areas, said negatives being cut at least large enough to cover said areas.

Signed at Rochester, New York, this 23rd day of June, 1927.

ALFRED J. NEWTON.